(12) United States Patent
Stadtlander et al.

(10) Patent No.: US 8,108,979 B2
(45) Date of Patent: Feb. 7, 2012

(54) USING A STIFFENER TO REPAIR A PART FOR AN AIRCRAFT ENGINE

(75) Inventors: Daniel M. Stadtlander, West Hartford, CT (US); William F. Bogue, Hebron, CT (US); Michael J. Madel, Jr., Colchester, CT (US); Brian K. Holland, Lansing, MI (US)

(73) Assignee: United Technologies Corporation, Hartford, CT (US)

( * ) Notice: Subject to any disclaimer, the term of this patent is extended or adjusted under 35 U.S.C. 154(b) by 1167 days.

(21) Appl. No.: 11/789,268

(22) Filed: Apr. 24, 2007

(65) Prior Publication Data

US 2008/0263844 A1 Oct. 30, 2008

(51) Int. Cl.
*B23P 6/00* (2006.01)
*B23P 19/04* (2006.01)

(52) U.S. Cl. .................... 29/402.09; 29/402.11
(58) Field of Classification Search ........... 29/402.09, 29/402.11
See application file for complete search history.

(56) References Cited

U.S. PATENT DOCUMENTS

| | | | | |
|---|---|---|---|---|
| 2,795,523 A * | 6/1957 | Cobb et al. | .......... | 156/94 |
| 3,700,517 A * | 10/1972 | Roach | .......... | 156/94 |
| 4,824,500 A * | 4/1989 | White et al. | .......... | 156/94 |
| 4,916,880 A * | 4/1990 | Westerman, Jr. | .......... | 52/514 |
| 5,023,987 A * | 6/1991 | Wuepper et al. | .......... | 29/402.11 |
| 5,190,611 A * | 3/1993 | Cologna et al. | .......... | 156/98 |
| 5,771,557 A * | 6/1998 | Contrasto | .......... | 29/402.11 |
| 5,928,448 A * | 7/1999 | Daws | .......... | 156/98 |
| 5,958,166 A * | 9/1999 | Walters et al. | .......... | 156/94 |
| 6,149,749 A * | 11/2000 | McBroom | .......... | 156/94 |
| 6,173,807 B1 | 1/2001 | Welch et al. | | |
| 6,770,349 B2 * | 8/2004 | Itoh et al. | .......... | 428/73 |
| 6,820,334 B2 | 11/2004 | Kebbede et al. | | |
| 7,118,640 B2 * | 10/2006 | Westerdahl et al. | .......... | 156/94 |
| 2006/0059828 A1 | 3/2006 | Stevenson et al. | | |
| 2006/0093847 A1 | 5/2006 | Hornick et al. | | |
| 2007/0079920 A1 * | 4/2007 | Holland | .......... | 156/98 |
| 2007/0275212 A1 * | 11/2007 | Stadtlander et al. | .......... | 428/116 |
| 2007/0289692 A1 * | 12/2007 | Bogue et al. | .......... | 156/98 |
| 2008/0000193 A1 * | 1/2008 | Holland et al. | .......... | 52/741.4 |

FOREIGN PATENT DOCUMENTS

EP 1167185 A2 1/2002

OTHER PUBLICATIONS

The extended European Search Report for counterpart European Application No. 08251481 filed Apr. 22, 2008.
Baker, A.A., Dr. "Chapter 13: Repair Techniques for Composite Structures" Composite Materials in Aircraft Structures, Jan. 1, 1990. pp. 207-227.

* cited by examiner

*Primary Examiner* — David Bryant
*Assistant Examiner* — Christopher Koehler
(74) *Attorney, Agent, or Firm* — Kinney & Lange, P.A.

(57) ABSTRACT

A method of repairing a part, which has a first side, a second side opposite of the first side, and an aperture that makes the part susceptible to cracking, includes the steps of forming a slot in the first side of the part near the aperture, inserting a stiffener into the slot, and attaching at least one repair ply onto the first side of the part to cover the stiffener.

19 Claims, 9 Drawing Sheets

USING A STIFFENER TO REPAIR A PART FOR AN AIRCRAFT ENGINE

BACKGROUND OF THE INVENTION

The present invention relates to a method and system of repairing a composite part of an aircraft engine. More particularly, the present invention relates to a method and system of repairing a cracked acoustic liner using a stiffener that is inserted into the liner.

An aircraft engine part that includes a large aperture may be structurally deficient due to a design of the part to accommodate the aperture. For example, an aircraft engine may include a plurality of acoustic liners or panels that are located between the struts of the intermediate case. The liners provide sound attenuation of fan noise and function as aerodynamic fairings. Commonly one of the acoustic liners may include a large cut-out in the center of the liner for receiving an air-oil cooler. Thus, on each side of the air-oil cooler, the acoustic liner may only have a thin portion of material; this design makes the acoustic liner prone to failure and cracking.

When there is a crack in the acoustic liner, it may be necessary to replace the liner to avoid potential damage to an outer case to which the liner is bolted or otherwise attached. However, a replacement liner may be costly. Alternatively, the engine may operate without the acoustic liners; however, this results in a reduction in fuel efficiency and an increase in noise levels. Thus, there is a need for a method of repairing a cracked acoustic liner.

BRIEF SUMMARY OF THE INVENTION

A method of repairing a part, which has a first side, a second side opposite of the first side (the second side is commonly a functional, contact or airflow surface), and an aperture that makes the part susceptible to cracking, includes the steps of forming a slot in the first side of the part near the aperture, inserting a stiffener into the slot, and attaching at least one repair ply onto the first side of the part to cover the stiffener.

DETAILED DESCRIPTION

Figure 1:
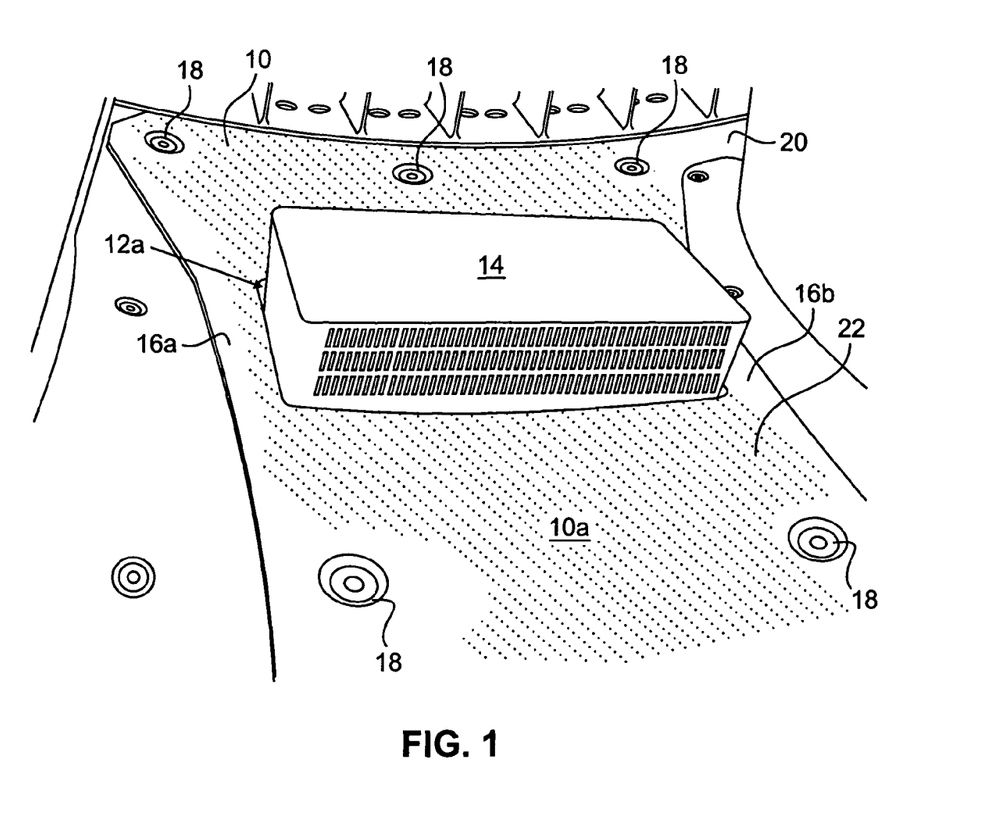
FIG. 1 is a perspective view of an acoustic liner of a gas turbine engine having a large cut-out or aperture for receiving an air-oil cooler.
Figure 2:
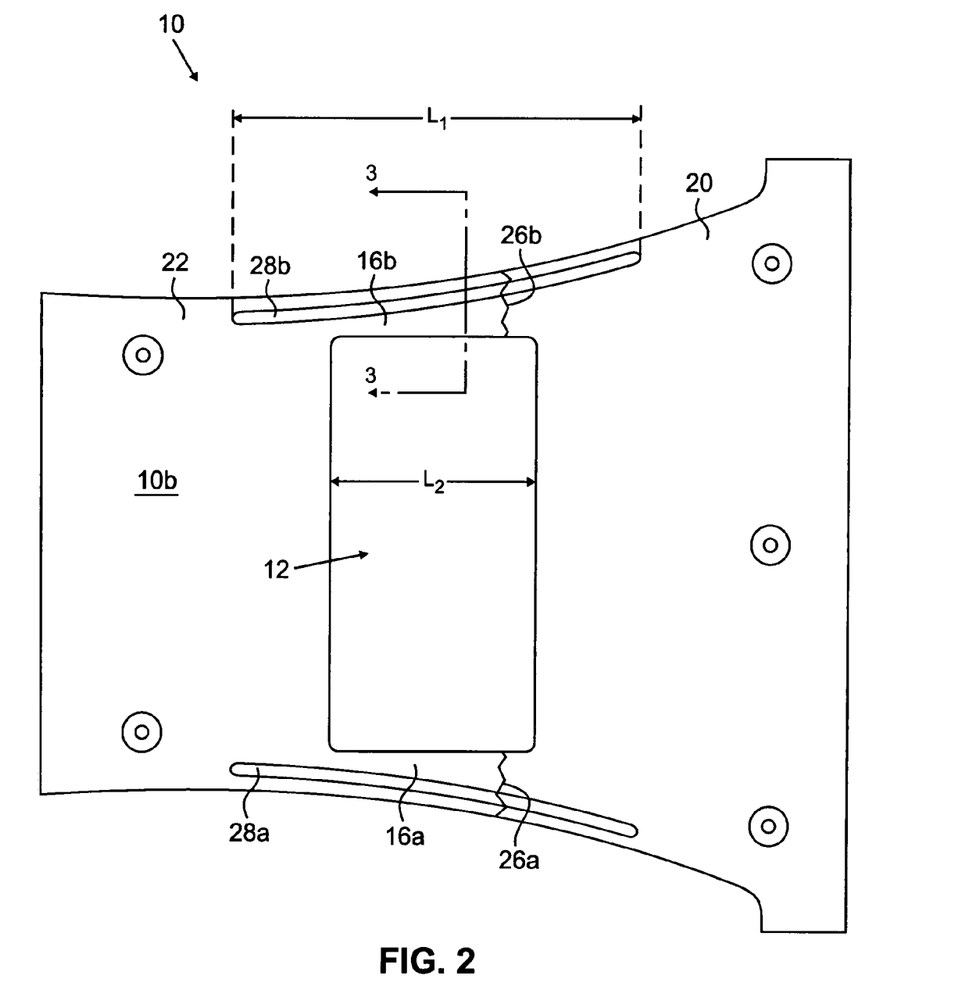
FIG. 2 is a back-view of the acoustic liner of FIG. 1 showing a first step in a repair process when a crack forms in the acoustic liner.

FIG. 1 is a perspective view of acoustic liner 10 which includes an acoustic side 10a (also known as an airflow side) and a non-acoustic side 10b (shown in FIG. 2). Acoustic liner 10 is typically a composite. In an exemplary embodiment, acoustic liner 10 may include an aluminum core, and acoustic side 10a may include a perforated skin, which may commonly be formed from fiberglass. Acoustic liner 10 includes aperture 12, which is a large cut-out configured to receive air-oil cooler 14. In a gas turbine engine, acoustic liner 10 is typically one of a plurality of acoustic liners or panels that are inserted between the struts of the intermediate case (not shown) and bolted to an inner or outer case (also not shown). (These component cases are part of an intermediate case assembly.) The other acoustic liners used in conjunction with acoustic liner 10, however, do not usually include aperture 12 since typically only a single air-oil cooler is used in the intermediate case assembly.

Due to the large size of aperture 12, side portions 16a and 16b of liner 10, which are located on each side of aperture 12, are thin and structurally weakened by aperture 12. As such, acoustic liner 10 may be prone to cracking in portions 16a and 16b. Typically, cracking occurs similarly or uniformly across portions 16a and 16b. As shown in FIG. 1, acoustic liner 10 includes a plurality of bolt holes 18 at both top portion 20 of liner 10 and bottom portion 22 of liner 10. Bolt holes 18 are used to secure liner 10 to the inner or outer case. However, if a crack forms in side portions 16a and 16b, such that liner 10 is essentially in two pieces, liner 10 may not remain static. In that case, bending moments of liner 10 may result in cracking of the inner or outer case to which liner 10 is attached. To avoid damage to the case, it may be necessary to repair or replace a cracked acoustic liner. Because it is costly to replace liner 10, it is preferable to repair liner 10. A repair process is described herein in which the repaired acoustic liner is structurally stronger, as compared to the original design of liner 10.

FIG. 2 is a back-view of acoustic liner 10 of FIG. 1, which may be referred to as non-acoustic side 10b of liner 10. (Air-oil cooler 14 has been removed for clarity.) In contrast to acoustic side 10a, non-acoustic side 10b is typically not perforated, but side 10b may still commonly include a fiberglass skin. As shown in FIG. 2, side portions 16a and 16b of liner 10 include cracks 26a and 26b.

FIGS. 2-10 illustrate one embodiment for repairing cracked acoustic liner 10. A first step of the repair process is to form slot 28a in portion 16a and slot 28b in portion 16b. Prior to forming slots 28a and 28b, liner 10 may be inserted into a fabricated tool and clamped into place. At this point, liner 10 may be in two pieces (top portion 20 and bottom portion 22), if cracks 26a and 26b had fully developed across liner 10. In that case, the two pieces of liner 10 are aligned when they are placed into the tool.

Slots 28a and 28b may then be formed in any number of ways, including, but not limited to, routing or milling. As detailed below in reference to FIG. 3, slots 28a and 28b are formed by removing a portion of the skin of non-acoustic side 10b and the aluminum core. The perforated skin of acoustic side 10a is not removed from slots 28a and 28b. After slots 28a and 28b are formed, liner 10 is removed from the tool and cleaned to remove any debris residing in or around slots 28a and 28b.

As shown in FIG. 2, a length $L_1$ of slots 28a and 28b is greater than a length $L_2$ of aperture 12, in order to adequately reinforce side portions 16a and 16b. The dimensions for length $L_1$ and a width of slots 28a and 28b may vary.

Figure 3:
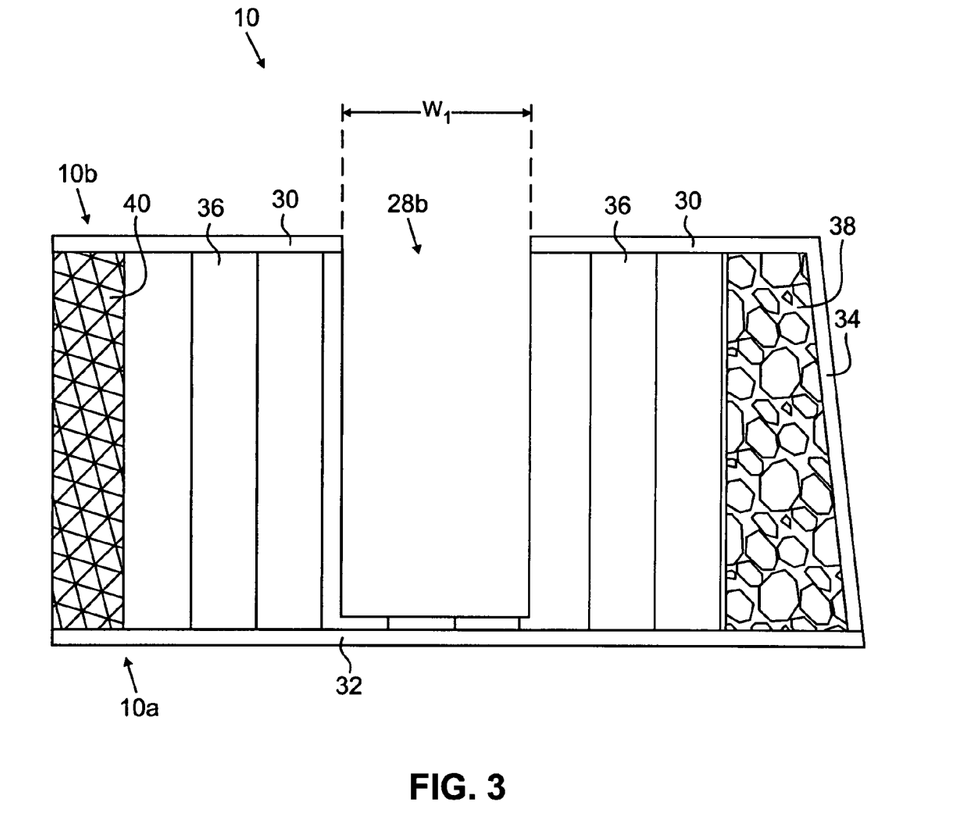
FIG. 3 is a cross-sectional view of a portion of the acoustic liner of FIG. 2 illustrating a slot formed in the acoustic liner (a first step in the repair) for receiving a stiffener.

FIG. 3 is a cross-sectional view of side portion 16b of liner 10 taken through section 3-3 of FIG. 2 and rotated 90 degrees clockwise. FIG. 3 shows a cross-section of slot 28b and surrounding side portion 16b of liner 10 prior to an insertion of a stiffener into slot 28b.

Liner 10 includes non-acoustic side 10b having fiberglass skin 30, acoustic side 10a having perforated (fiberglass) skin 32, outer edge skin 34 (also made of fiberglass), aluminum core 36, foam adhesive 38, and potting compound 40. Foam adhesive 38 is used as a low-density filler between aluminum core 36 and outer edge skin 34; it is recognized that other low-density materials may be used in place of a foam adhesive.

Slot 28b extends through fiberglass skin 30 and aluminum core 36. As shown in FIG. 3, in preferred embodiments, slot 28b does not extend completely through aluminum core 36, and a layer of core 36 remains below slot 28b. In an exemplary embodiment, a width $W_1$ of slot 28b is approximately equal to 0.2 to 0.3 inches. (Slot 28a has similar dimensions to slot 28b.)

Figure 4:
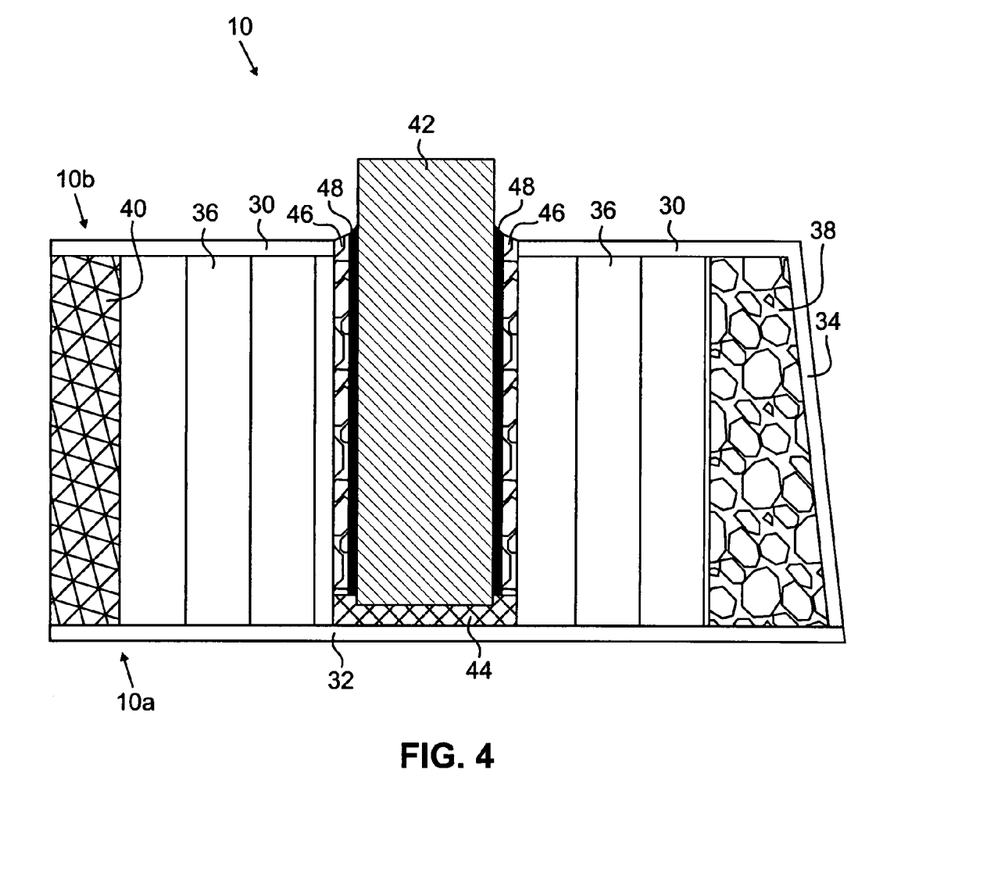
FIGS. 4-6 illustrate additional steps that may be part of the repair process.
Figure 5:
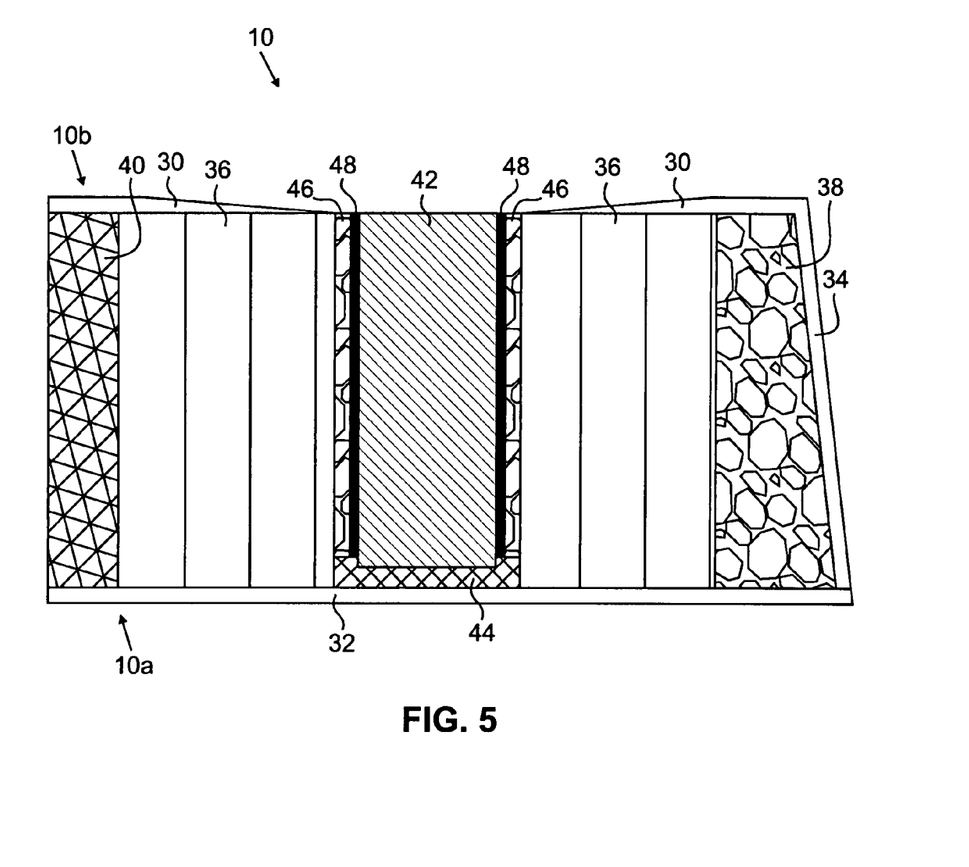
Figure 6:
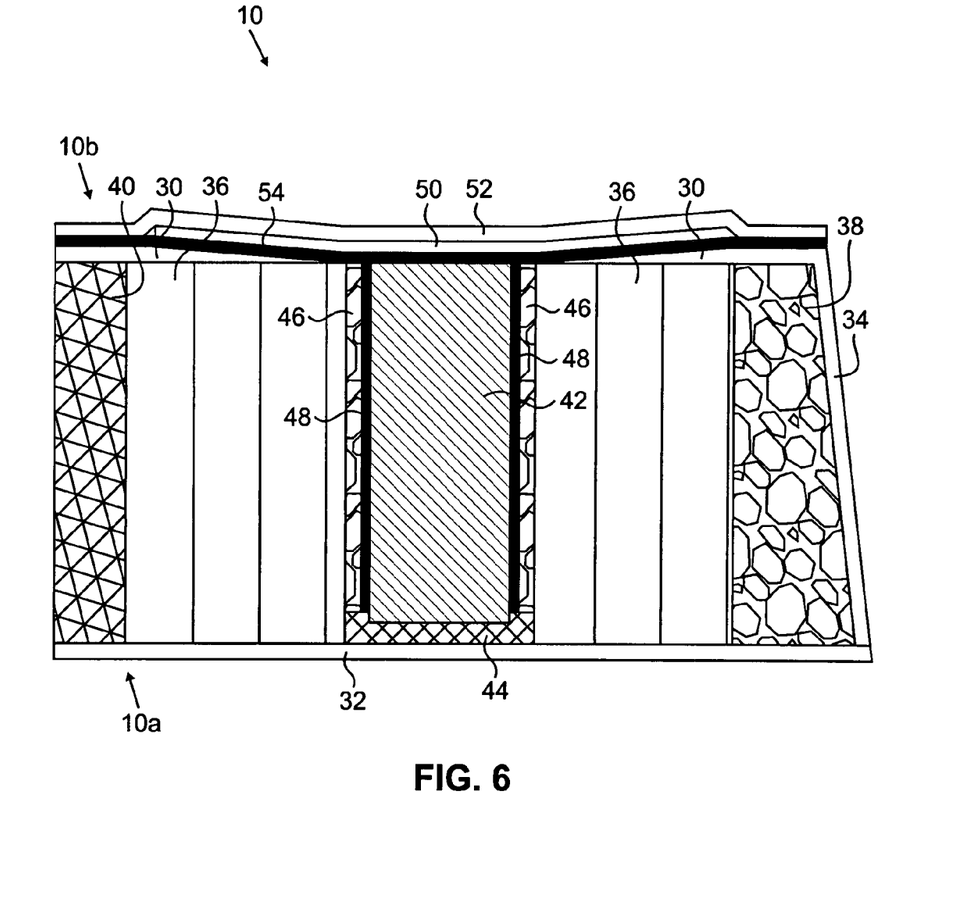

FIGS. 4-6 illustrate subsequent steps in the repair process following the formation of slots 28a and 28b in liner 10. FIG. 4 is another cross-sectional view, similar to FIG. 3 showing stiffener 42 inserted into slot 28b.

Stiffener 42 may be formed from plies of fiberglass which may be impregnated with resin. Stiffener 42 may be made using a fabricated mold that matches a contour of machined slot 28b. The layers of plies that make up stiffener 42 are compacted together, and the resin and plies are then cured using heat to form a stiffened structure. The excess glue or resin is bled out from the fiberglass plies. Stiffener 42 may then be trimmed to size based upon a size of slot 28b. Stiffener 42 may also be abraded and cleaned.

In an exemplary embodiment, stiffener 42 is formed from approximately twenty plies of fiberglass pre-impregnated with epoxy. Following compression of the plies, a thickness of stiffener 42 is approximately 0.2 inches or less. It is recognized that more or less plies may be used to form stiffener 42. Moreover, an alternative resin may be substituted for epoxy.

Before stiffener 42 is inserted into slot 28b, liner 10 may be reinserted back into the tool used during a formation of slots 28a and 28b. Slot 28b may then be cleaned in preparation for the insertion of stiffener 42. If liner 10 is in two pieces, an adhesive may be applied to broken edges created by cracks 26a and 26b of FIG. 2 so that the two pieces of liner 10 are reattached to one another.

Referring back to FIG. 4, adhesive 44 may be applied to a portion of aluminum core 36 exposed at a bottom of slot 28b. Adhesive 44 may include, but is not limited to, an epoxy paste adhesive, and is used to bond stiffener 42 to aluminum core 36 or perforated skin 32. Next, adhesive 46 may be applied to exposed aluminum core 36 on both sides of slot 28b. Adhesive 46 may include, but is not limited to, a low-density syntactic or foaming adhesive. Prior to inserting stiffener 42 into slot 28b, adhesive 48 may be applied to both sides of stiffener 42. Adhesive 48 may include, but is not limited to, an epoxy film adhesive. Stiffener 42 may then be inserted into slot 28b such that bottom portion of stiffener 42 bonds with adhesive 44, and the sides of stiffener 42, having adhesive 48, bond with adhesive 46. In alternative embodiments, the sides of stiffener 42 may be bonded directly to adhesive 46. After stiffener 42 is in place within slot 28b, high heat may be applied to cure resin within adhesive layers 44, 46 and 48.

It is recognized that the dimensions of stiffener 42 (i.e. length and width) may be slightly smaller than the dimensions of slot 28b to account for a thickness of adhesive layers 44, 46 and 48, and to provide a minimal amount of clearance for inserting stiffener 42 into slot 28b. As shown in FIG. 4, stiffener 42 may have a height that is greater than a height or depth of slot 28b such that stiffener 42 extends past fiberglass skin 30. Adhesive layers 46 and 48 may also extend past skin 30.

FIG. 5 shows additional steps that may be performed after stiffener 42 is inserted into slot 28b. Stiffener 42 and adhesive layers 46 and 48 are ground down to a level where they are essentially flush with aluminum core 36. Next, fiberglass skin 30 is sanded such that skin 30 is tapered on each side of stiffener 42. Any debris is removed from liner 10 and then exposed surfaces of skin 30 may be cleaned.

In FIG. 6, repair plies 50 and 52 have been attached to skin 30 of non-acoustic side 10b and stiffener 42 to cover stiffener 42 and an area of skin 30 surrounding stiffener 42. Adhesive layer 54 may first be attached to skin 30 and stiffener 42, and may extend out to outer edge skin 34. Adhesive layer 54 is designed to be approximately the same size as repair ply 50. Adhesive layer 54 may be similar in composition to adhesive 48, which is used to attach the sides of stiffener 42 to the sides of slot 28b. In some embodiments, adhesive layer 54 may be an epoxy film adhesive.

Repair ply 50 is next attached to adhesive layer 54 and then repair ply 52 is attached over repair ply 52. Repair ply 52 is preferably larger than repair ply 50. In some embodiments, repair ply 52 overlaps repair ply 50 by a minimum of 0.5 inches. Repair plies 50 and 52 may also be formed from pre-impregnated fiberglass. In an exemplary embodiment, plies 50 and 52 are impregnated with epoxy resin. After attaching repair plies 50 and 52 to non-acoustic side 10b of liner 10, high heat is applied to repair plies 50 and 52 to cure the resin contained within the fiberglass.

Figure 7:
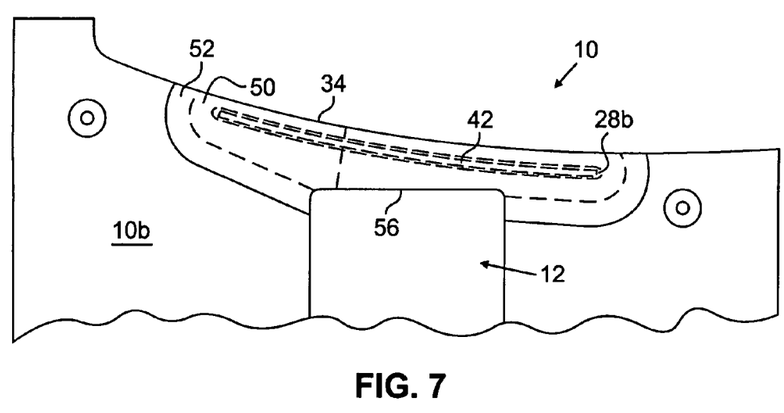
FIG. 7 is a back-view of the acoustic liner following the repair steps illustrated in FIGS. 4-6.

FIG. 7 is a front-view of a portion of non-acoustic side 10b of liner 10 after repair plies 50 and 52 have been attached to side 10b. FIG. 7 shows stiffener 42 inside slot 28b and repair ply 50 covering stiffener 42 and a surrounding area. Repair ply 52 is shown overlapping repair ply 50 on all sides except for outer edge skin 34 and edge skin 56 of aperture 12.

Repair plies 50 and 52 may be used to further reinforce side portion 16b of liner 10. In the exemplary embodiment shown and described above, two repair plies are attached to side portion 16b. It is recognized that more than two repair plies, or less than two repair plies (i.e. one repair ply) may alternatively be used to cover stiffener 42.

Figure 8:
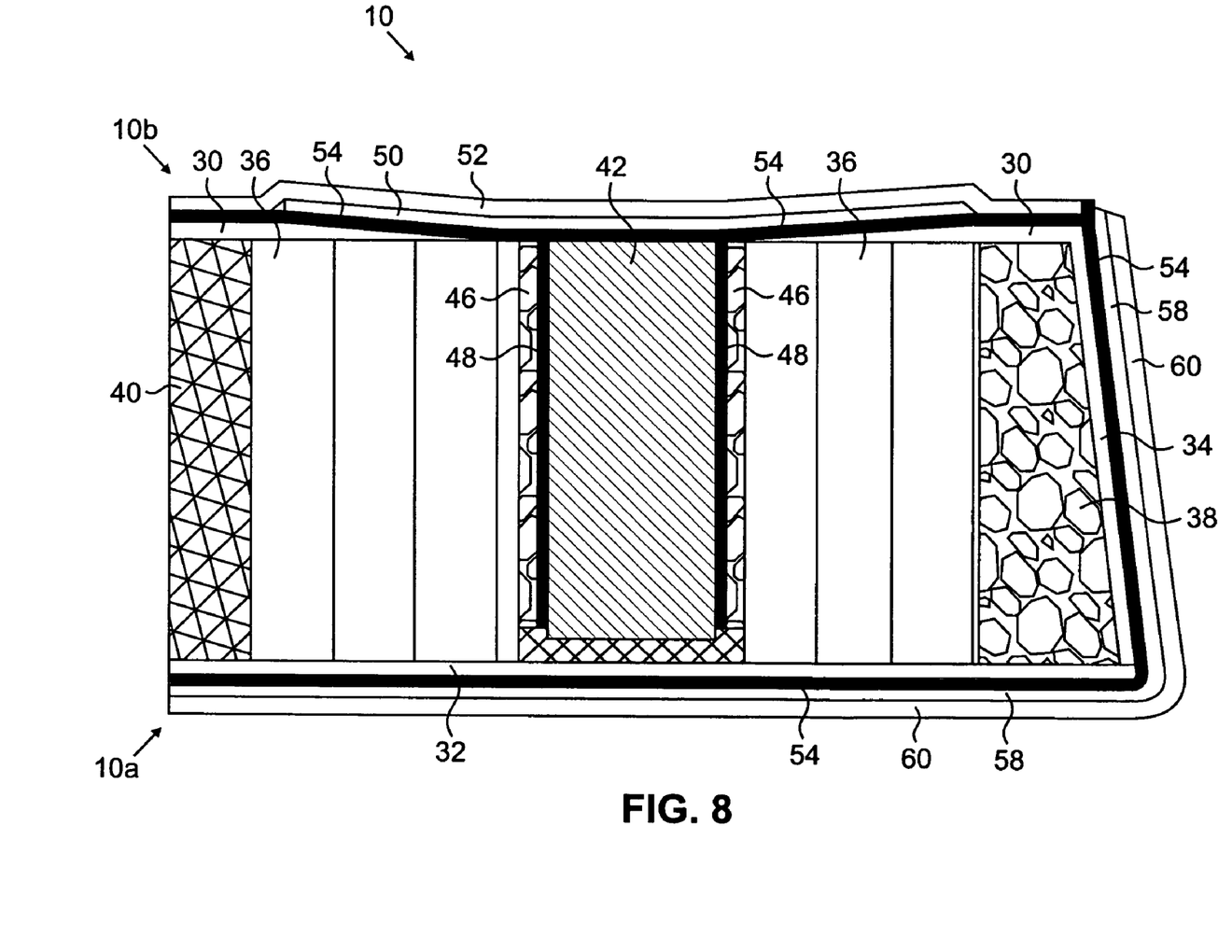
FIG. 8 is a cross-sectional view of the portion of the acoustic liner shown in FIGS. 2 and 4-6 illustrating a final step in the repair process.
Figure 9:
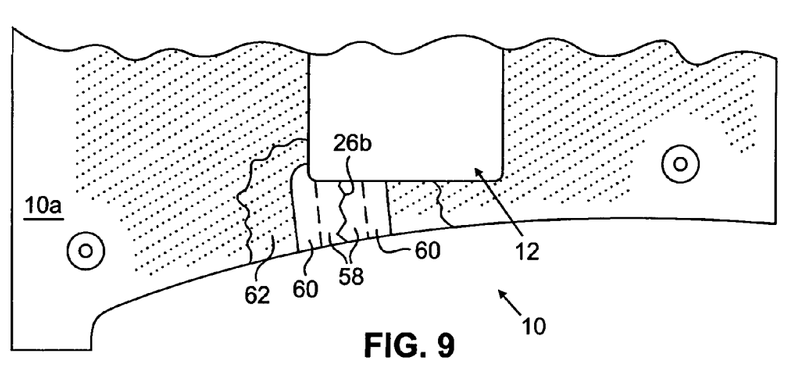
FIG. 9 is a front-view of the acoustic liner following the step illustrated in FIG. 8.

FIG. 8 is another cross-sectional view of liner 10, including slot 28b with stiffener 42 to illustrate a subsequent step in which repair plies 58 and 60 are attached to perforated skin 32 on acoustic side 10a and outer edge skin 34. Repair plies 58 and 60 on acoustic side 10a are oriented perpendicular to repair plies 50 and 52 of non-acoustic side 10b. As illustrated by FIG. 9, repair plies 58 and 60 are attached to perforated skin 32 in an area of side portion 16b where crack 26b had formed. Repair plies 58 and 60 commonly cover a smaller area of liner 10, as compared to repair plies 50 and 52.

In order to attach repair plies 58 and 60 to skins 32 and 34, adhesive 54 is attached to skin 32 and 34. Perforated skin 32 on acoustic side 10a commonly includes an erosion resistant coating, such as, for example, a PVF erosion film. In that case, to adequately bond adhesive 54 to skin 32, the erosion resistant coating is first removed from an area surrounding crack 26b.

Prior to attaching adhesive 54 and repair plies 58 and 60, perforated skin 32 may be sanded near crack 26b, as similarly described above in reference to FIG. 5. Through sanding, perforated skin 32 may be tapered such that perforated skin 32 is thinner on both sides of crack 26b. In an exemplary embodiment, tapering may begin approximately 0.5 inches on either side of crack 26b (not visible in FIG. 8; see FIG. 9). Outer edge skin 34 may also be sanded. After sanding of skins 32 and 34, exposed surfaces may then be cleaned.

FIG. 9 is a front view of acoustic side 10*a* of the portion of liner 10 shown in FIG. 7 (i.e. liner 10 is flipped over relative to FIG. 7). As shown in FIG. 9, repair plies 58 and 60 have been attached to acoustic side 10*a* to cover crack 26*b*. Area 62 represents an area in which the erosion coating has been removed from perforated skin 32.

Adhesive 54 is used to bond repair plies 58 and 60 to acoustic side 10*a* and outer edge 34 of liner 10. Adhesive 54 is approximately equal in size to repair ply 60. In the embodiment shown in FIG. 9, repair ply 58 covers an area that is at least 0.50 inches on either side of crack 26*b*, and repair ply 60 overlaps repair ply 58 by at least 0.5 inches on both sides relative to crack 26*b*. Repair plies 58 and 60 both wrap around an outer edge of liner 10 in order to cover crack 26*b* in a side skin (outer edge skin 34) of liner 10.

Figure 10:
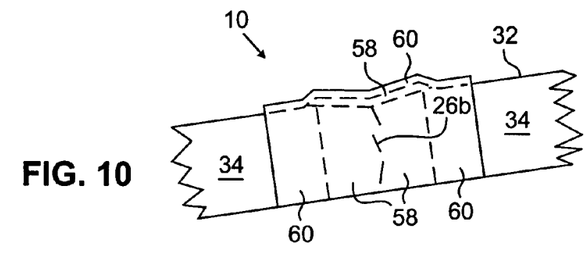
FIG. 10 is a side-view of a portion of the acoustic liner of FIG. 9.

FIG. 10 is a side view of a portion of liner 10 of FIG. 9 to illustrate the use of repair plies 58 and 60 to cover crack 26*b* in the side of liner 10, which is covered by outer edge skin 34. In FIG. 10, tapering of perforated skin 32 is visible in an area which is covered by smaller repair ply 58. FIG. 10 also illustrates how repair ply 60 overlaps repair ply 58 on both sides of crack 26*b*, both on perforated skin 32 and outer edge skin 34.

As described above for repair plies 50 and 52, after attaching repair plies 58 and 60, high heat is applied to acoustic side 10*a* and side skin 34 to cure resin and fiberglass in repair plies 58 and 60. At this point, any excess material from plies 58 and 60 may be trimmed from perforated skin 32 or outer edge skin 34. Moreover, repair plies 58 and 60 may be further sanded along with perforated skin 32 to better blend repair plies 58 and 60 with skin 32. An erosion protection coating may then be reapplied to area 62 of perforated skin 32.

The repair process as described above is in reference to repairing crack 26*b* on side portion 16*b* of liner 10. As stated above and shown in FIG. 2, typically cracks 26*a* and 26*b* form in a similar manner on both sides of aperture 12. The repair process described above is similarly performed on side portion 16*a* of liner 10, starting with slot 28*a*, as shown in FIG. 2.

Figure 11:
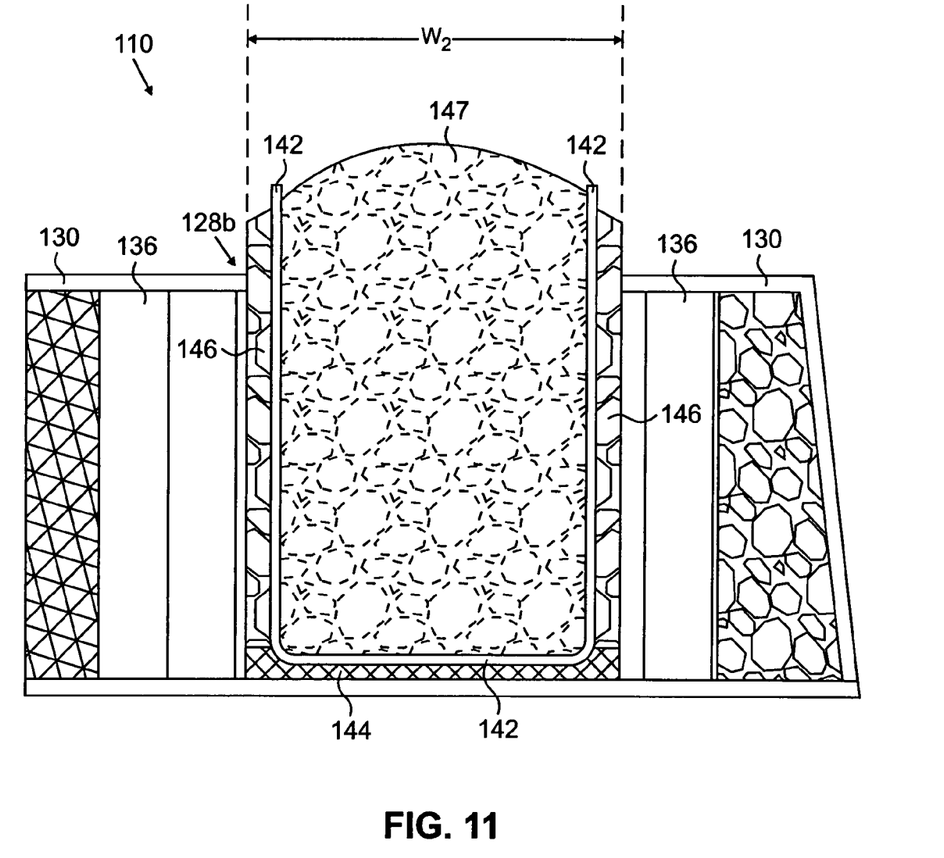
FIG. 11 is a cross-sectional view illustrating another embodiment of the present invention.

FIG. 11 is a cross-sectional view illustrating another embodiment of the present invention. FIG. 11 illustrates an alternative design to stiffener 42. In the embodiment shown in FIG. 4, stiffener 42 is a solid beam of material having essentially equal dimensions to slot 28*b* formed in liner 10. In the alternative embodiment of FIG. 11, stiffener 142 is a prefabricated channel having a U-shape.

Slot 128*b* is formed in liner 110 in a similar manner to slot 28*b* of FIG. 3 in that a portion of fiberglass skin 130 on non-acoustic side 110*b* and aluminum core 136 are removed. A thin layer of aluminum core 136 remains below slot 128*b*. In the exemplary embodiment of FIG. 11, slot 128*b* has a width $W_2$ equal to approximately 0.5 inches, as compared to slot 28*b* of FIG. 3, which has a width $W_1$ of approximately 0.2 to 0.3 inches. In other embodiments, width $W_2$ may be more than or less than 0.5 inches.

As shown in FIG. 11, adhesive 144 may be applied to a bottom of slot 128*b*, as described above in reference to FIG. 4. Before inserting stiffener 142 into slot 128*b*, adhesive 146 may be applied to sides of slot 128*b*. A second adhesive may be attached to adhesive 146 or, as shown in FIG. 11, stiffener 142 may be directly attached to adhesive 146.

Stiffener 142 may be used as an alternative to stiffener 42 in order to minimize an amount of weight added to liner 110 as a result of the repair process. In some cases, stiffener 142 may be structurally stronger than the solid beam design of stiffener 42. Instead of a U-shaped stiffener, it is recognized that additional shapes may be used. Stiffener 142, like stiffener 42, may be formed from plies of fiberglass. Because stiffener 142 is not a solid beam of material, any unoccupied space within slot 128*b* may be filled by adhesive 147, as shown in FIG. 11. Adhesive 147 and adhesive 146 may be formed from the same material or from different materials. Adhesive 147 may include, but is not limited to, a foaming adhesive, low-density syntactic, or potting material. Adhesive 147 may be inserted into slot 128*b* at the same time stiffener 142 is inserted into slot 128*b*, or before or after stiffener 142 is inserted into slot 128*b*.

After inserting stiffener 142, adhesive 146 and adhesive 147 into slot 128*b*, subsequent steps in the repair process are similar to those described above for stiffener 42 and in reference to FIGS. 5-10. For example, stiffener 142, adhesive 146 and adhesive 147 may be ground down to be essentially flush with aluminum core 136, as shown above in FIG. 5 for stiffener 42.

The repair process described herein has a structural benefit since the insertion of the stiffener results in an acoustic liner with a stronger design. Moreover, the repair process provides an economic benefit because the acoustic liner may be repaired instead of having to replace the liner.

Although the repair process has been described herein in regards to repair of an acoustic liner, it is recognized that this repair process is applicable to other engine parts or other areas of an aircraft, particularly composite structures. For example, a stiffener may be used to reinforce or repair a portion of the nacelle structure that may be prone to cracking. The stiffener may be used for any part having a large cut-out, if the part requires repair due to a crack near the cut-out. Alternatively, in the absence of a crack, the stiffener may improve the durability of the part.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A method of repairing a first part having a first side, a second side opposite of the first side, and an aperture created during manufacture of the first part configured to receive a second part which makes the first part susceptible to cracking in a region immediately adjacent the manufactured aperture, the method comprising:

forming a first slot and a second slot in the first side of the part, wherein both the first slot and the second slot are spaced at a distance from but are disposed in close proximity to the manufactured aperture, and wherein the second slot is disposed on an opposing side of the manufactured aperture from the first slot, and the first slot and the second slot have a length that exceeds a length or diameter of the manufactured aperture;

inserting a stiffener into each of the first and second slots, wherein each stiffener strengthens the region immediately adjacent the manufactured aperture, and wherein each stiffener extends substantially the length of each respective slot but does not extend to the manufactured aperture; and attaching at least one repair ply onto the first side of the part to cover the stiffeners, wherein the one repair ply does not extend to cover over the manufactured aperture.

2. The method of claim 1 further comprising:
attaching at least one repair ply onto the second side of the part.

3. The method of claim 1 wherein inserting the stiffeners into the first and second slot comprises:
applying a first adhesive to a bottom of the slot;
applying a second adhesive to a first side and a second side of the slot; and
applying a third adhesive to a first side and a second side of the stiffener; and
attaching the first side of the stiffener to the first side of the slot and the second side of the stiffener to the second side of the slot.

4. The method of claim 3 further comprising:
curing the stiffener and the adhesives after inserting the stiffener into the slot.

5. The method of claim 1 further comprising:
grinding a portion of the stiffener after inserting the stiffener into the slot until an exposed surface of the stiffener is at or slightly below a surface of the first side of the part.

6. The method of claim 5 wherein the first side of the part includes a fiberglass skin and the method further comprises:
sanding a portion of the fiberglass skin adjacent to the stiffener.

7. The method of claim 1 wherein the stiffener and the at least one repair ply are formed of fiberglass.

8. The method of claim 7 wherein the fiberglass is impregnated with epoxy.

9. A method of reinforcing an acoustic liner of an aircraft engine having an acoustic side, a non-acoustic side, and a large aperture in the liner created during manufacture of the liner and configured to receive another part, the manufactured aperture makes the liner susceptible to cracking in a region immediately adjacent the manufactured aperture, the method comprising:
forming a slot in the non-acoustic side of the liner, wherein the slot is located at a distance from but is disposed in close proximity to the manufactured aperture and does not extend to the manufactured aperture, and wherein the slot has a length that exceeds a length or diameter of the manufactured aperture;
securing a stiffener into the slot using at least one adhesive, wherein the stiffener strengthens the region immediately adjacent the manufactured aperture, and wherein the stiffener extends substantially a length of the slot but does not extend to the manufactured aperture; and
attaching at least one repair ply to the non-acoustic side of the liner to cover the stiffener, wherein the one repair ply does not extend to cover over the manufactured aperture.

10. The method of claim 9 wherein securing a stiffener into the slot includes:
applying a first adhesive to the stiffener; and
applying a second adhesive to the slot.

11. The method of claim 10 wherein the first and second adhesives are selected from a group consisting of epoxy, paste, film, and foam.

12. The method of claim 10 wherein securing a stiffener into the slot includes curing the stiffener and the first and second adhesives.

13. The method of claim 10 wherein the first adhesive includes a film adhesive.

14. The method of claim 13 wherein the second adhesive includes a foaming adhesive.

15. The method of claim 14 wherein the film adhesive is configured to attach to the foaming adhesive inside the slot, and the second side of the film adhesive is configured to attach to the stiffener.

16. The method of claim 9 further comprising:
attaching at least one repair ply to the acoustic side of the liner.

17. The method of claim 16 wherein the liner includes a crack and the at least one repair ply is attached to the acoustic side of the liner to cover the crack.

18. The method of claim 9 wherein the at least one repair ply includes fiberglass.

19. The method of claim 9 wherein the stiffener has a length and a width approximately equal to a length and a width of the slot.

* * * * *